United States Patent
Liu

(10) Patent No.: US 9,258,407 B2
(45) Date of Patent: Feb. 9, 2016

(54) PORTABLE ELECTRONIC DEVICE HAVING PLURALITY OF SPEAKERS AND MICROPHONES

(71) Applicant: Chiun Mai Communication Systems, Inc., New Taipei (TW)

(72) Inventor: Cheng-Ping Liu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/473,054

(22) Filed: Aug. 29, 2014

(65) Prior Publication Data

US 2015/0065113 A1    Mar. 5, 2015

(30) Foreign Application Priority Data

Aug. 30, 2013   (CN) .......................... 2013 1 0386964

(51) Int. Cl.
| | | |
|---|---|---|
| H04M 3/00 | (2006.01) | |
| H04M 1/725 | (2006.01) | |
| H04W 52/02 | (2009.01) | |
| H04M 1/60 | (2006.01) | |

(52) U.S. Cl.
CPC .......... H04M 1/72569 (2013.01); H04M 1/605 (2013.01); H04W 52/0254 (2013.01); H04M 2250/12 (2013.01)

(58) Field of Classification Search
CPC ..................... H04M 1/72569; H04W 52/0254
See application file for complete search history.

(56) References Cited

U.S. PATENT DOCUMENTS

| | | | | |
|---|---|---|---|---|
| 8,189,818 | B2 * | 5/2012 | Takahashi et al. ............ | 381/122 |
| 2011/0002487 | A1 * | 1/2011 | Panther et al. ................ | 381/300 |
| 2011/0317041 | A1 * | 12/2011 | Zurek et al. ............. | 348/240.99 |
| 2013/0275873 | A1 * | 10/2013 | Shaw et al. .................... | 715/716 |
| 2014/0086415 | A1 * | 3/2014 | Sim et al. ........................ | 381/17 |
| 2014/0233772 | A1 * | 8/2014 | Giustina ...................... | 381/306 |
| 2014/0254802 | A1 * | 9/2014 | Fukazawa ....................... | 381/17 |
| 2014/0270248 | A1 * | 9/2014 | Ivanov et al. .................. | 381/92 |
| 2014/0274218 | A1 * | 9/2014 | Kadiwala et al. ............. | 455/570 |
| 2015/0078555 | A1 * | 3/2015 | Zhang et al. .................... | 381/26 |

* cited by examiner

*Primary Examiner* — Erin File
(74) *Attorney, Agent, or Firm* — Novak Druce Connolly Bove + Quigg LLP

(57) ABSTRACT

A portable electronic device includes a display unit, a first audio unit, a second audio unit, a first sensing unit, a second sensing unit, and a controlling unit. The first audio unit includes a first speaker and a first microphone. The second audio unit includes a second speaker and a second microphone. The first sensing unit senses an orientation of the portable electronic device. The second sensing unit senses whether a user is close to one of the first speaker and the second speaker. The controlling unit triggers one of the first audio unit and the second audio unit to output and input audio signals according to the orientation of the portable electronic device and turns off the display unit when the user is close to the one of the first speaker and the second speaker.

16 Claims, 3 Drawing Sheets

PORTABLE ELECTRONIC DEVICE HAVING PLURALITY OF SPEAKERS AND MICROPHONES

CROSS-REFERENCE TO RELATED APPLICATIONS

This application claims priority to Chinese Patent Application No. 201310386964.X filed on Aug. 30, 2013 in the China Intellectual Property Office, the contents of which are incorporated by reference herein.

FIELD

The disclosure generally relates to a portable electronic device having a plurality of speakers and microphones.

BACKGROUND

Portable electronic devices, such as mobile phones or personal digital assistants (PDAs), commonly include a speaker and a microphone arranged at opposite ends thereof. To obtain acceptable communication quality, a user usually holds a portable electronic device in a certain direction/orientation so that the speaker and the microphone are respectively located near an ear and a mouth of the user.

BRIEF DESCRIPTION OF THE DRAWINGS

Implementations of the present technology will now be described, by way of example only, with reference to the attached figures.

DETAILED DESCRIPTION

Figure 1:
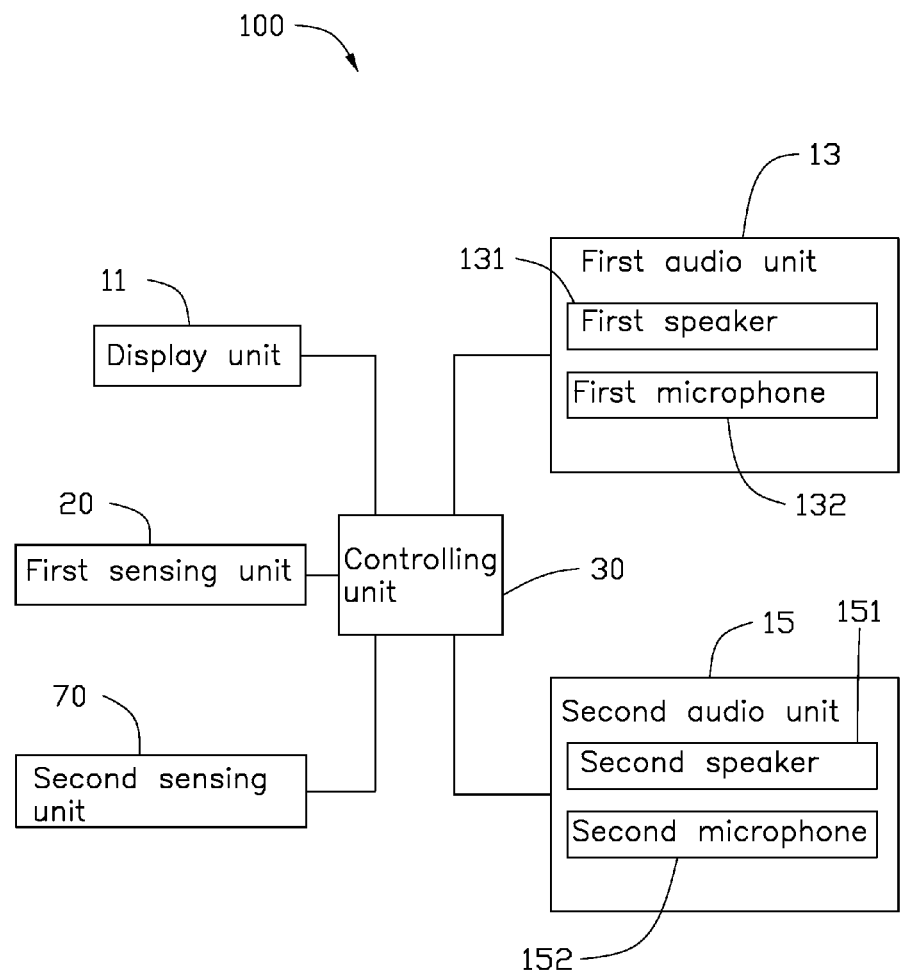
FIG. 1 is a block diagram of an embodiment of a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of a portable electronic device 100. The portable electronic device 100 may be a mobile phone or a personal digital assistant (PDA). The portable electronic device 100 includes a display unit 11, a first audio unit 13, a second audio unit 15, a first sensing unit 20, a controlling unit 30, and a second sensing unit 70.

The first audio unit 13 includes a first speaker 131 and a first microphone 132. The second audio unit 15 includes a second speaker 151 and a second microphone 152. The first speaker 131 and the second microphone 152 are positioned at a side of the display unit 11. The first microphone 132 and the second speaker 151 are positioned at an opposite side of the display unit 11.

The first sensing unit 20 can be a gravity sensor or a gyroscope. In this embodiment, the first sensing unit 20 is a gravity sensor and is electronically connected to the controlling unit 30. The first sensing unit 20 senses an acceleration value of the portable electronic device 100 (such as, Gx, Gy, Gz) which represents an orientation the portable electronic device 100 and sends the sensed acceleration value to the controlling unit 30. In this embodiment, the first sensing unit 20 can sense at least three orientations of the portable electronic device 100.

The controlling unit 30 may be a central processing unit (CPU) of the portable electronic device 100 and is electronically connected to the display unit 11, the first audio unit 13, and the second audio unit 15. The controlling unit 30 receives the sensed acceleration value from the first sensing unit 20 and determines an orientation of the portable electronic device 100 according to the sensed acceleration value, for example, a first direction, a second direction, and a third direction. In this embodiment, the first direction represents that the first speaker 131 is above the second speaker 151. The second direction represents that the first speaker 131 is below the second speaker 151. The third direction represents that the first speaker 131 and the second speaker 151 are substantially at the same height. The controlling unit 30 triggers the first audio unit 13 or the second audio unit 15 to output and input audio signals according to the sensed orientation of the portable electronic device 100.

The second sensing unit 70 is electronically connected to the controlling unit 30 and is configured to sense whether an user is close to the first speaker 131 or the second speaker 151. The controlling unit 30 turns off the display unit 11 when the second sensing unit 70 senses that the user is close to the first speaker 131 or the second speaker 151 during a call.

Figure 2:
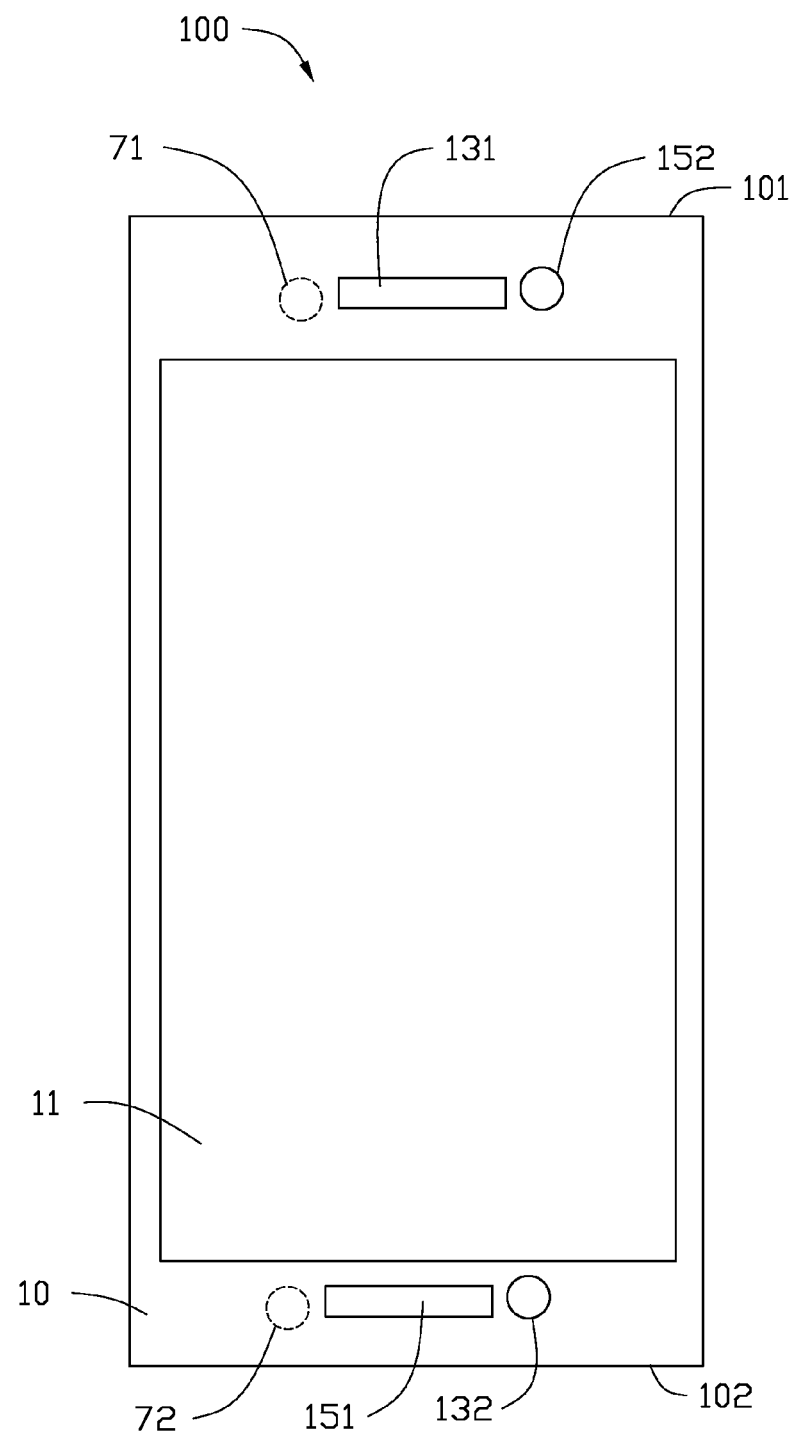
FIG. 2 is a diagrammatic view of the portable electronic device of FIG. 1.

FIG. 2 illustrates that the portable electronic device 100 further includes a housing 10. The housing 10 includes a first end 101 and a second end 102 opposite to the first end 101. The display unit 11 is positioned in the middle of one surface of the housing 10. The first speaker 131 and the second microphone 152 are positioned on the first end 101. The second speaker 132 and the first microphone 151 are positioned on the second end 102. The first sensing unit 20 is secured in an inner of the housing 10.

As illustrated, the second sensing unit 70 includes a first proximity sensor 71 and a second proximity sensor 72. The first proximity sensor 71 is adjacent to the first speaker 131. The second proximity sensor 72 is adjacent to the second speaker 151. The first proximity sensor 71 and the second proximity sensor 72 are both electronically connected to the controlling unit 30. The first proximity sensor 71 is configured to detect whether the user is close to the first speaker 131 through means of infrared or ultrasonic when the first speaker 131 is selected by the controlling unit 30. Once the first proximity sensor 71 detects that the user is close to the first speaker 131, the first proximity sensor 71 sends a sensing signal to the controlling unit 30. The second proximity sensor 72 is configured to detect whether the user is close to the second speaker 151 through means of infrared or ultrasonic when the second speaker 151 is selected by the controlling unit 30. Once the second proximity sensor 72 detects that the user is close to the second speaker 151, the second proximity sensor 72 sends a sensing signal to the controlling unit 30. When the controlling unit 30 receives the sensing signal from the first proximity sensor 71 or the second proximity 72 during a call, such as a call is coming or a call is set up, the controlling unit 30 determines that the user does not need to operate the display unit 11. Thus, the controlling unit 30 turns off the display unit 11 to save power of the portable electronic device 100.

Figure 3:
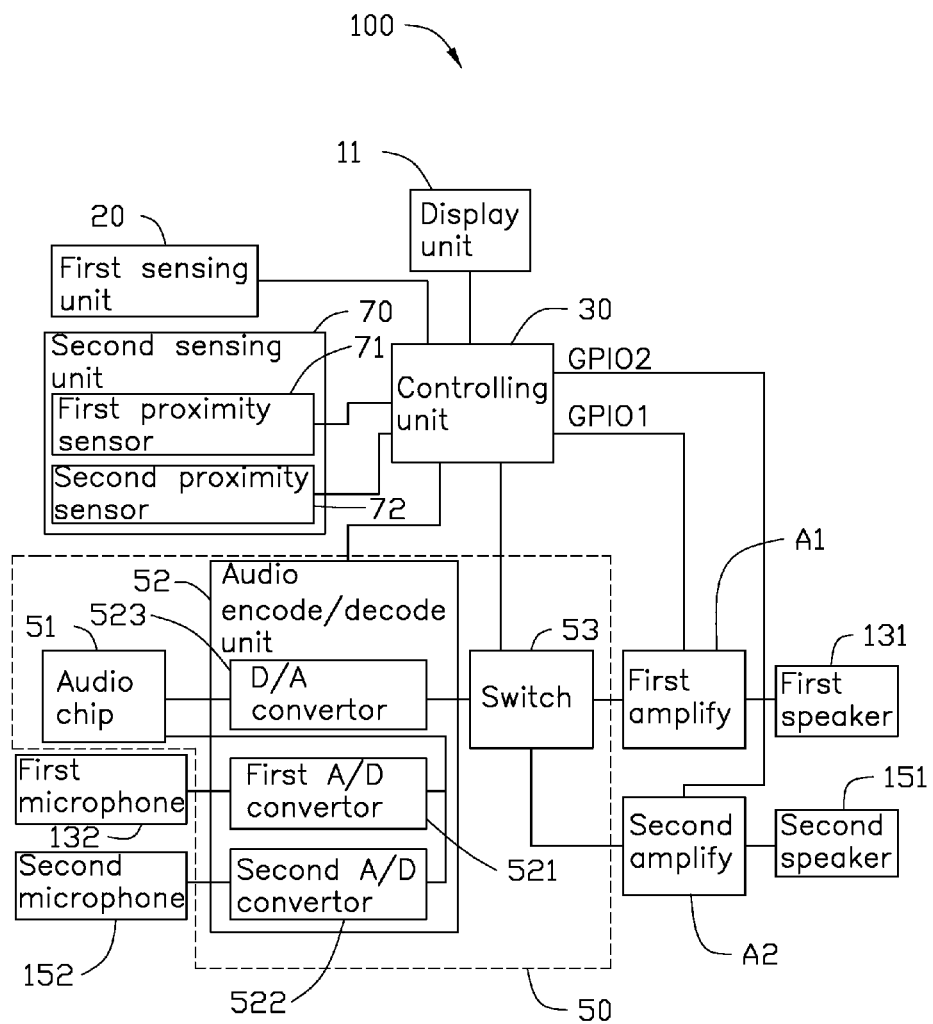
FIG. 3 is a block diagram of the portable electronic device of FIG. 1.

FIG. 3 illustrates the portable electronic device 100 further includes a switching unit 50. The switching unit 50 is electronically connected to the controlling unit 30, the first audio unit 13, and the second audio unit 15. The controlling unit 30 triggers the first audio unit 13 or the second audio unit 15 to output and input audio signals through the switching unit 50. For example, when the controlling unit 30 determines that the portable electronic device 100 is in the first direction according to the sensed acceleration value from the first sensing unit 20 (that is, the first speaker 131 is above the second speaker 151), the controlling unit 30 switches the switching unit 50 to a first mode to select the first audio unit 13 (that is, the first speaker 131 and the first microphone 132). When the controlling unit 30 determines that the portable electronic device 100 is in the second direction according to the sensed acceleration value from the first sensing unit 20 (that is, the first speaker 131 is below the second speaker 151), the controlling unit 30 switches the switching unit 50 to a second mode to select the second audio unit 15 (that is, the second speaker 151 and the second microphone 152).

As illustrated, the switching unit 50 includes an audio chip 51, an audio encode/decode unit 52, and a switch 53. The audio encode/decode unit 52 is electronically connected to the audio chip 51, the first microphone 132, and the second microphone 152. The switch 53 is electronically connected to the audio encode/decode unit 52, the first speaker 131, and the second speaker 151. The audio encode/decode unit 52 includes a first analog/digital (A/D) convertor 521, a second A/D convertor 522, and a digital/analog (D/A) convertor 523. The audio chip 51 is configured to receive and send audio signals. The first A/D convertor 521 is electronically connected between the audio chip 51 and the first microphone 132 and is configured to process the audio signals from the first microphone 132 and sends the processed audio signals to the audio chip 51. The second A/D convertor 522 is electronically connected between the audio chip 51 and the second microphone 152 and is configured to process the audio signals from the second microphone 152 and sends the processed audio signals to the audio chip 51. The D/A convertor 523 is electronically connected between the audio chip 51 and the switch 53. The switch 53 may be a relay and is electronically connected to the first speaker 131 and the second speaker 151. The D/A convertor 523 is configured to process the audio signals from the audio chip 51 and plays the processed audio signals by the switch 53 selecting the first speaker 131 or the second speaker 151.

In this embodiment, the audio encode/decode unit 52 and the switch 53 are both electronically connected to the controlling unit 30 and can select corresponding speaker and microphone under the control of the controlling unit 30. For example, when the controlling unit 30 determines that the portable electronic device 100 is in the first direction, the controlling unit 30 controls the audio encode/decode unit 52 to select the first A/D convertor 521 and the first microphone 132, and controls the switch 53 to select the first speaker 131. Then, the user can receive and send audio signals through the selected first speaker 131 and the first microphone 132. That is, the audio signals from the user can be sent by the first microphone 132, the first A/D convertor 521, and the audio chip 51. The audio signals from outside can be received by the audio chip 51, the D/A convertor 523, the switch 53, and the first speaker 131. Similarly, when the controlling unit 30 determines that the portable electronic device 100 is in the second direction, the controlling unit 30 controls the audio encode/decode unit 52 to select the second A/D convertor 522 and the second microphone 152, and controls the switch 53 to select the second speaker 151. Then, the user can receive and send audio signals through the selected second speaker 151 and the second microphone 152. That is, the audio signals from the user can be sent by the second speaker 151, the second A/D convertor 522, and the audio chip 51. The audio signals from outside can be received by the audio chip 51, the D/A convertor 523, the switch 53, and the second speaker 151.

In other embodiment, the portable electronic device 100 further includes a first amplifier A1 and a second amplifier A2. The first amplifier A1 is electronically connected to the switch 53 and the first speaker 131. The second amplifier A2 is electronically connected to the switch 53 and the second speaker 151. The first amplifier A1 is configured to amplify the audio signals from the audio chip 51 and send the amplified audio signal to the first speaker 131. The second amplifier A2 is configured to amplify the audio signal from the audio chip 51 and send the amplified audio signal to the second speaker 151.

In other embodiment, the controlling unit 30 further includes a first control terminal GPIO1 and a second control terminal GPIO2. The first control terminal GPIO1 is electronically connected to the first amplifier A1. The second control terminal GPIO2 is electronically connected to the second amplifier A2. When the controlling unit 30 determines the portable electronic device 100 is in a telephone mode, the controlling unit 30 adjusts a gain of the first amplifier A1 by the first control terminal GPIO1 (for example, the gain of the first amplifier A1 is adjusted to 0 dB) or adjusts a gain of the second amplifier A2 by the second control terminal GPIO2 (for example, the gain of the second amplifier A2 is adjusted to 0 dB), thereby to decrease a volume output by the first speaker 131 or the second speaker 151.

In use, when the portable electronic device 100 is hold in the first direction, the first sensing unit 20 senses an acceleration value of the portable electronic device 100. The controlling unit 30 receives the sensed acceleration value of the portable electronic device 100 from the first sensing unit 20 and determines that the portable electronic device 100 is in the first direction. Then, the controlling unit 30 drives the audio encode/decode unit 52 to select the first A/D convertor 521 and the first microphone 132 and drives the switch 53 to select the first speaker 131. That is, the first speaker 131 and the first microphone 132 are selected to output and input audio signals. Due to the first speaker 131 is selected, the controlling unit 30 further triggers the first proximity sensor 71 near the first speaker 131 to detect whether the user is close to the first speaker 131. Once the controlling unit 30 determines that the portable electronic device 100 is in a telephone mode, that is the portable electronic device 100 is during a call, and receives the sensing signal from the first proximity sensor 71, the controlling unit 30 determines that the user does not need to operate the display unit 11. Thus, the controlling unit 30 turns off the display unit 11 to save power of the portable electronic device 100. Furthermore, the controlling unit 30 adjusts a gain of the first amplifier A1 by the first control terminal GPIO1 to decrease a volume output by the first speaker 131 which can effectively avoid a large volume to hurt an ear of the user.

Similarly, when the portable electronic device 100 is hold in the second direction, the first sensing unit 20 senses an acceleration value of the portable electronic device 100. The controlling unit 30 receives the sensed acceleration value of the portable electronic device 100 from the first sensing unit 20 and determines that the portable electronic device 100 is in the second direction. Then, the controlling unit 30 drives the audio encode/decode unit 52 to select the second A/D convertor 522 and the second microphone 152 and drives the switch 53 to select the second speaker 151. That is, the second speaker 151 and the second microphone 152 are selected to output and input audio signal. Due to the second speaker 151 is selected, the controlling unit 30 further triggers the second proximity sensor 72 near the second speaker 151 to detect whether the user is close to the second speaker 151. Once the controlling unit 30 receives the sensing signal from the second proximity sensor 72, the controlling unit 30 determines that the portable electronic device 100 is in a telephone mode and the user does not need to operate the display unit 11. Thus, the controlling unit 30 turns off the display unit 11 to save power of the portable electronic device 100. Furthermore, the controlling unit 30 adjusts a gain of the second amplifier A2 by the second control terminal GPIO2 to decrease a volume output by the second speaker 151 which can effectively avoid a large volume to hurt an ear of the user.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A portable electronic device, comprising:
 a display unit;
 a first audio unit, comprising:
  a first speaker positioned at a side of the display unit; and
  a first microphone positioned at an opposite side of the display unit;
 a second audio unit, comprising:
  a second speaker positioned at the opposite side of the display unit; and
  a second microphone positioned at the side of the display unit;
 a first sensing unit configured to sense an orientation of the portable electronic device;
 a second sensing unit configured to sense whether an user is close to one of the first speaker and the second speaker;
 a controlling unit electronically connected to the first sensing unit and the second sensing unit; and
 a switching unit electronically comprising an audio chip, an audio encode/decode unit, and a switch, the audio encode/decode unit is electronically connected to the audio chip, the first microphone, and the second microphone; the switch is electronically connected to the audio encode/decode unit, the first speaker, and the second speaker; the audio encode/decode unit and the switch are both electronically connected to the controlling unit;
 wherein the controlling unit triggers the audio encode/decode unit and the switch to select one of the first audio unit and the second audio unit to output and input audio signals according to the orientation of the portable electronic device and turns off the display unit when the user is close to one of the first speaker and the second speaker during a call.

2. The portable electronic device of claim 1, further comprising a housing, wherein the display unit is positioned in the middle of one surface of the housing; the housing comprises a first end and a second end opposite to the first end; the first speaker and the second microphone are positioned on the first end, and the second speaker and the first microphone are positioned on the second end.

3. The portable electronic device of claim 1, wherein the second sensing unit comprises a first proximity sensor and a second proximity sensor, the first proximity sensor is adjacent to the first speaker, and the second proximity sensor is adjacent to the second speaker.

4. The portable electronic device of claim 3, wherein when the user is close to one of the first speaker and the second speaker, the one of the first proximity sensor and the second proximity sensor sends a sensing signal to the controlling unit, the controlling unit receives the sensing signal and turns off the display unit.

5. The portable electronic device of claim 1, wherein the controlling unit drives the switching unit to select the first audio unit when the first sensing unit senses that the portable electronic device is in a first direction where the first speaker is above the second speaker, and the controlling unit drives the switching unit to select the second audio unit when the first sensing unit senses that the portable electronic device is in a second direction where the first speaker is below the second speaker.

6. The portable electronic device of claim 1, wherein the controlling unit drives the audio encode/decode unit to select the first microphone and drives the switch to select the first speaker when the controlling unit determines that the portable electronic device is in the first direction; the controlling unit drives the audio encode/decode unit to select the second microphone and drives the switch to select the second speaker when the controlling unit determines that the portable electronic device is in the second direction.

7. The portable electronic device of claim 1, wherein the audio encode/decode unit comprises a first analog/digital (A/D) convertor, a second A/D convertor, and a digital/analog (D/A) convertor; the first A/D convertor is electronically connected between the audio chip and the first microphone and is configured to process audio signals from the first microphone and sends the processed audio signals to the audio chip; the second A/D convertor is electronically connected between the audio chip and the second microphone and is configured to process the audio signals from the second microphone and sends the processed audio signals to the audio chip; the D/A convertor is electronically connected between the audio chip and the switch and is configured to process the audio signals from the audio chip and plays the processed audio signals by the switch selecting the one of the first speaker and the second speaker.

8. The portable electronic device of claim 1, further comprising a first amplifier and a second amplifier, wherein the first amplifier is electronically connected to the switch and the first speaker and is configured to amplify the audio signals and send the amplified audio signals to the first speaker; the second amplifier is electronically connected to the switch and the second speaker and is configured to amplify the audio signals and send the amplified audio signals to the second speaker.

9. The portable electronic device of claim 8, wherein the controlling unit comprises a first control terminal and a second control terminal, the first control terminal is electronically connected to the first amplifier, the second control terminal is electronically connected to the second amplifier; the controlling unit adjusts a gain of the first amplifier by the first control terminal a gain of the second amplifier by the second control terminal to decrease a volume output by the one of the first speaker and the second speaker when the portable electronic device is in a telephone mode.

10. A portable electronic device, comprising:
a housing comprising a first end and a second end opposite to the first end;
a display unit positioned in the middle of one surface of the housing;
a first speaker positioned on the first end;
a second speaker positioned on the second end;
a first microphone positioned on the second end;
a second microphone positioned on the first end;
a first sensing unit configured to sense an orientation of the portable electronic device;
a second sensing unit configured to sense whether an user is close to one of the first speaker and the second speaker;
a controlling unit electronically connected to the first sensing unit and the second sensing unit; and
a switching unit electronically comprising an audio chip, an audio encode/decode unit, and a switch, the audio encode/decode unit is electronically connected to the audio chip, the first microphone, and the second microphone; the switch is electronically connected to the audio encode/decode unit, the first speaker, and the second speaker; the audio encode/decode unit and the switch are both electronically connected to the controlling unit;
wherein the controlling unit drives the audio encode/decode unit and the switch to select one group of the first speaker and the first microphone and the second speaker and the second microphone according to the sensed orientation of the portable electronic device and closes the display unit when the user is close to the one of the first speaker and the second speaker.

11. The portable electronic device of claim 10, wherein the second sensing unit comprises a first proximity sensor and a second proximity sensor, the first proximity sensor is adjacent to the first speaker, and the second proximity sensor is adjacent to the second speaker; when the user is close to the one of the first speaker and the second speaker, one of the first proximity sensor and the second proximity sensor sends a sensing signal to the controlling unit, the controlling unit receives the sensing signal and closes the display unit.

12. The portable electronic device of claim 10, wherein the controlling unit drives the switching unit to select the first speaker and the first microphone when the first sensing unit senses that the portable electronic device is in a first direction where the first speaker is above the second speaker, and the controlling unit drives the switching unit to select the second speaker and the second microphone when the first sensing unit senses that the portable electronic device is in a second direction where the first speaker is below the second speaker.

13. The portable electronic device of claim 10, wherein the controlling unit drives the audio encode/decode unit to select the first microphone and drives the switch to select the first speaker when the controlling unit determines that the portable electronic device is in the first direction; the controlling unit drives the audio encode/decode unit to select the second microphone and drives the switch to select the second speaker when the controlling unit determines that the portable electronic device is in the second direction.

14. The portable electronic device of claim 10, wherein the audio encode/decode unit comprises a first analog/digital (A/D) convertor, a second A/D convertor, and a digital/analog (D/A) convertor; the first A/D convertor is electronically connected between the audio chip and the first microphone and is configured to process audio signals from the first microphone and sends the processed audio signals to the audio chip; the second A/D convertor is electronically connected between the audio chip and the second microphone and is configured to process the audio signals from the second microphone and sends the processed audio signals to the audio chip; the D/A convertor is electronically connected between the audio chip and the switch and is configured to process the audio signals from the audio chip and plays the processed audio signals by the switch selecting the one of the first speaker and the second speaker.

15. The portable electronic device of claim 10, further comprising a first amplifier and a second amplifier, wherein the first amplifier is electronically connected to the switch and the first speaker and is configured to amplify the audio signals and send the amplified audio signals to the first speaker; the second amplifier is electronically connected to the switch and the second speaker and is configured to amplify the audio signals and send the amplified audio signals to the second speaker.

16. The portable electronic device of claim 15, wherein the controlling unit comprises a first control terminal and a second control terminal, the first control terminal is electronically connected to the first amplifier, the second control terminal is electronically connected to the second amplifier; the controlling unit adjusts a gain of the first amplifier by the first control terminal or a gain of the second amplifier by the second control terminal to decrease a volume output by the one of the first speaker and the second speaker when the portable electronic device is in a telephone mode.

* * * * *